(12) United States Patent
Ebert

(10) Patent No.: US 11,385,411 B2
(45) Date of Patent: Jul. 12, 2022

(54) FIBER CLAMP

(71) Applicant: PHYSIK INSTRUMENTE (PI) GMBH & CO. KG, Karlsruhe (DE)

(72) Inventor: Michael Ebert, Karlsruhe (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 0 days.

(21) Appl. No.: 16/651,474

(22) PCT Filed: Sep. 27, 2018

(86) PCT No.: PCT/DE2018/100816
§ 371 (c)(1),
(2) Date: Mar. 27, 2020

(87) PCT Pub. No.: WO2019/063046
PCT Pub. Date: Apr. 4, 2019

(65) Prior Publication Data
US 2020/0264380 A1    Aug. 20, 2020

(30) Foreign Application Priority Data

Sep. 28, 2017   (DE) .......................... 102017122537.4

(51) Int. Cl.
G02B 6/36       (2006.01)
F16B 2/10       (2006.01)
F16L 3/10       (2006.01)

(52) U.S. Cl.
CPC ............... *G02B 6/364* (2013.01); *F16B 2/10* (2013.01); *F16L 3/10* (2013.01)

(58) Field of Classification Search
CPC ............... G02B 6/364; F16B 2/10; F16L 3/10
See application file for complete search history.

(56) References Cited

U.S. PATENT DOCUMENTS

| 4,088,386 A | 5/1978 | Hawk |
| 4,102,561 A | 7/1978 | Hawk et al. |
| 4,252,407 A | 2/1981 | Bubanko et al. |
| 4,276,113 A | 6/1981 | Carlsen et al. |
| 4,435,038 A * | 3/1984 | Soes ................... G02B 6/3801 385/70 |

(Continued)

FOREIGN PATENT DOCUMENTS

| DE | 2529267 A1 | 3/1976 |
| DE | 2626907 A1 | 1/1977 |

(Continued)

OTHER PUBLICATIONS

Translation of Office Action of the German Patent Office, dated Aug. 29, 2018 and Reply to Office Action, dated Aug. 30, 2019, DE Application 10 2017 122 537.4, Filed Sep. 28, 2017 (5 pages).

(Continued)

*Primary Examiner* — Sung H Pak
(74) *Attorney, Agent, or Firm* — BCF LLP

(57) ABSTRACT

The invention relates to a fiber clamp with a base plate and at least two clamping bodies arranged parallel to one another on the base plate, the clamping bodies being pressed towards one another in one direction by means of a tensioning device, so that a fiber that can be arranged between the base plate and the clamping bodies is between the base plate and the clamping bodies can be pinched.

16 Claims, 2 Drawing Sheets

(56) References Cited

U.S. PATENT DOCUMENTS

Figure 1:
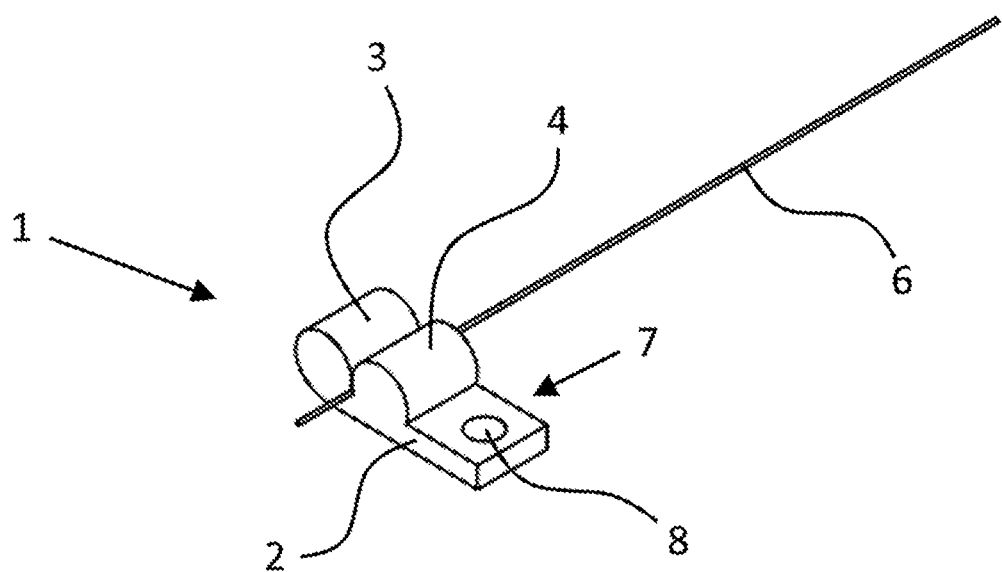

| | | | |
|---|---|---|---|
| 4,725,119 A | | 2/1988 | Lecomte et al. |
| 5,102,212 A | * | 4/1992 | Patterson ............. G02B 6/3801 385/98 |
| 5,138,681 A | * | 8/1992 | Larson ................. G02B 6/3636 385/95 |
| 2004/0120682 A1 | | 6/2004 | Bhagavatula et al. |
| 2012/0257860 A1 | | 10/2012 | Li et al. |

FOREIGN PATENT DOCUMENTS

| | | |
|---|---|---|
| DE | 2849975 C2 | 10/1987 |
| DE | 19625260 A1 | 1/1998 |
| EP | 1208396 B1 | 10/2003 |
| GB | 2314940 A | 1/1998 |

OTHER PUBLICATIONS

International Search Report, PCT/DE2018/100816, dated Jan. 7, 2019, 2 pages (in English).
Written Opinion of the International Searching Authority, PCT/DE2018/100816, dated Jan. 7, 2019, 5 pages (in English).

\* cited by examiner

FIBER CLAMP

The invention relates to a fiber clamp according to claim 1.

From document U.S. Pat. No. 4,276,113, a holder or a clamp for optical fibers is known, which consists of two parts which, when in an assembled state, engage in each other like a comb and can thereby clamp an optical fiber between themselves in a precisely positioned manner. For this purpose, one of the parts comprises a plurality of similar sections with a V-shaped groove and gaps which are disposed between these sections, while the other part has an essentially complementary shape and comprises essentially V-shaped projection sections and sections with a V-shaped recess which are arranged one behind the other and in an alternating sequence comprises. In the assembled state, the V-shaped projection sections engage in the sections with a V-shaped groove, while the sections with a V-shaped recess engage in the gaps. An optical fiber inserted into the holder comes to lie in the assembled state between the sections with a V-shaped groove and the V-shaped projection sections, and at the same time is supported on the surfaces of the V-shaped recesses. In this way, reliable and positionally stable mounting or clamping of the optical fiber is achieved in a simple manner.

A disadvantage of the fiber clamp known from U.S. Pat. No. 4,276,113, however, is its comparatively complex construction or its complexity and the comparatively cumbersome handling.

DE 26 26 907 also describes a device for clamping fibers, in which the respective fiber is disposed in the intermediate region between two adjacent elevations of a base plate which are partially circular in cross section and touching one another and with the aid of an elevation of a hold-down device which is also partially circular in cross section, which protrudes into said intermediate area, is clamped between the fiber-contacting surfaces of the elevations of the base plate and the elevation of the hold-down device.

DE 25 29 267 discloses, in a manner similar to DE 26 26 907, the clamping of a fiber either between three cylindrical or part-cylindrical bodies which are in contact with one another or between two mutually contacting cylindrical bodies and a flat counter surface. Here, the cylindrical or partially cylindrical bodies lie in recesses of two plate-shaped elements which are arranged opposite one another or are pressed against one another.

From DE 28 49 975 C2 it is known to dispose a fiber in the space between two adjacent cylindrical and touching steel bodies, and at the time to contact the fiber via an elastic intermediate piece, wherein the elastic intermediate piece simultaneously presses the fiber against the surfaces of the two steel bodies.

Against the background of the fiber clamps known from the aforementioned prior art, it is the object of the invention to provide a fiber clamp which is simple and therefore inexpensive to implement, which comprises a low complexity and at the same time is easy to use.

This object is achieved by a fiber clamp according to claim 1. By the features of the subclaims the invention is further realized.

The term 'essentially' used in the complete following part of the description in connection with the specification of geometrical data such as angles, dimensions, positions, orientations or directions is to be understood such that the corresponding geometrical data may have a deviation of +/−5% in relation to the given geometric date in each case, wherein this deviation is due, for example, to manufacturing or assembly tolerances.

The fiber clamp according to the invention comprises a base plate and at least two clamping bodies arranged parallel and adjacent to one another on the base plate. The at least two adjacent clamping bodies are pressed towards one another in one direction via a tensioning device which is formed only in the base plate or both in the base plate and the clamping bodies, so that a fiber which is disposed between the base plate and the clamping bodies can be clamped in that the fiber comes into contact or in line contact with the two adjacent clamping bodies and the base plate.

In this way, a fiber clamp which is simple and inexpensive to implement is achieved, which is also extremely easy to use. To insert or remove the fiber, it is only necessary to move or separate the respective adjacent clamping bodies slightly from one another by the action of an external force, so that a gap or an enlarged gap is created between the clamping bodies, which must be just as large, that a fiber to be held with the same can be inserted into the fiber clamp. As soon as the fiber is inserted, the external force to move the clamping bodies away from one another or separate the same can be eliminated, so that the tensioning device formed in the base plate or in the base plate and the clamping bodies ensures that the clamping bodies tend to establish their original position or orientation and to move the neighboring clamps towards each other again. As a result, the fiber inserted into the fiber clamp is clamped between the clamping bodies and the base plate without the action of an additional force, as a result of which the fiber comes into contact both with the two adjacent clamping bodies and with the base plate.

The clamping forces acting on the fiber can be regulated via the tensioning device, wherein the tensioning device may be realized by an elastic material of the base plate or of the base plate and of the clamping bodies themselves, or by an additional spring element which is embedded in the base plate. A combination of an embedded spring element in the base plate and the intrinsic elastic properties of the material of the base plate or of the base plate and of the clamping bodies is also conceivable.

The geometry of the clamping bodies and the area of the base plate between two adjacent clamping bodies is preferably to be selected such that even with different fiber diameters a reliable clamping is realized, in which the respective fiber is in contact with the assigned two clamping bodies and the base plate in the area between the two adjacent clamping bodies and in which accordingly there are essentially three corresponding line contacts.

It can be advantageous for the clamping bodies to be formed integrally or in one piece with the base plate. The integral or one-piece construction facilitates the implementation of a very compact, one-piece fiber clamp.

It can also be advantageous for the clamping bodies to have the shape of a cylinder or a partial cylinder. Due to the resulting circular or partially circular outer geometry of the clamping body, a secure contact is achieved and thus a secure clamping with the generally circular outer geometry of the fiber. It can also be advantageous here that the base plate comprises a web section with a convex cross-sectional geometry in the area between the two adjacent clamping bodies, so that the web section points in one direction to the two clamping bodies. This leads in a further improved manner to a secure clamping of the fiber, and in a particularly preferred manner to a respective line contact between the fiber and each of the two adjacent clamping bodies and between the fiber and the web section.

Furthermore, it can be advantageous that either the clamping body alone, or the clamping body and the base plate comprise a rubber-like or elastomeric material and preferably consist of a rubber-like or elastomeric material. Rubber-like or elastomeric materials comprise the advantage of being highly elastic, so that when the fiber is clamped, the compressive forces acting on it remain low and adverse effects within the fiber due to high compressive forces are avoided. In addition, rubber-like or elastomeric materials generally comprise a comparatively high coefficient of friction, so that the displacement of a fiber which is inserted and clamped in the fiber clamp in its longitudinal direction or in a direction substantially perpendicular to the direction of action of the clamping forces is only possible with a comparatively great effort. This results in a positionally stable and reliable clamping, in which the compressive forces acting on the clamped fiber are low at the same time.

In addition, it can be advantageous for the tensioning device to comprise at least one spring element embedded in the fiber clamp. The spring element is preferably formed by a spring plate. In this way, a possibility of influencing the clamping force which is exerted on the fiber by the clamping bodies is achieved, wherein this possibility is independent of the material properties of the base plate or the clamping bodies or is provided in addition.

Further, it can also be advantageous that the base plate comprises a fastening section with a through hole for fastening to a higher-level unit. In this way, the fiber clamp can be arranged and fastened easily and quickly, for example on a positioning device.

In the following, exemplary embodiments of the invention are described with reference to the attached figures.

Figure 2:
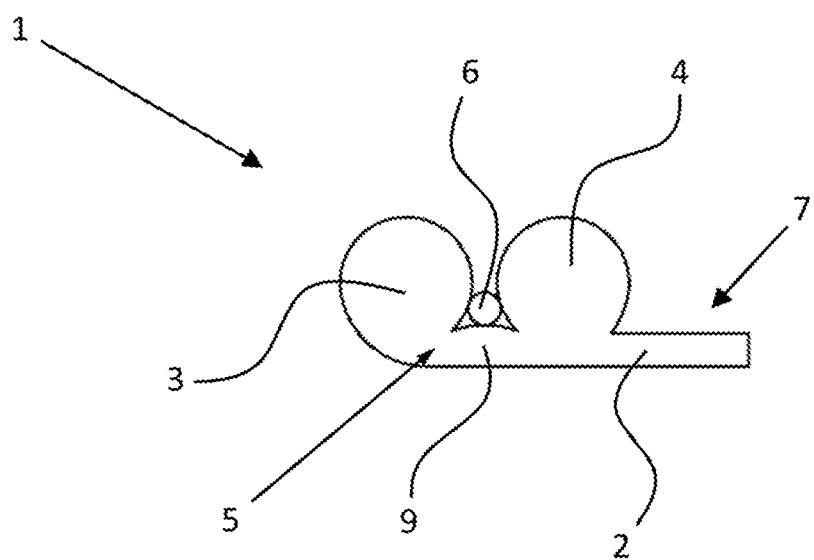
Figure 3:
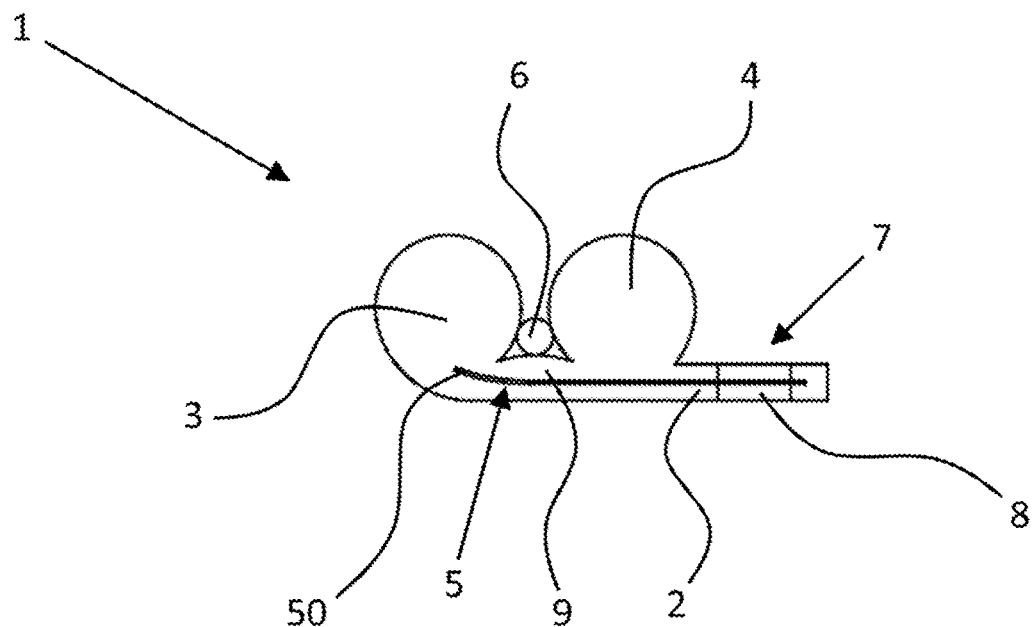
Figure 4:
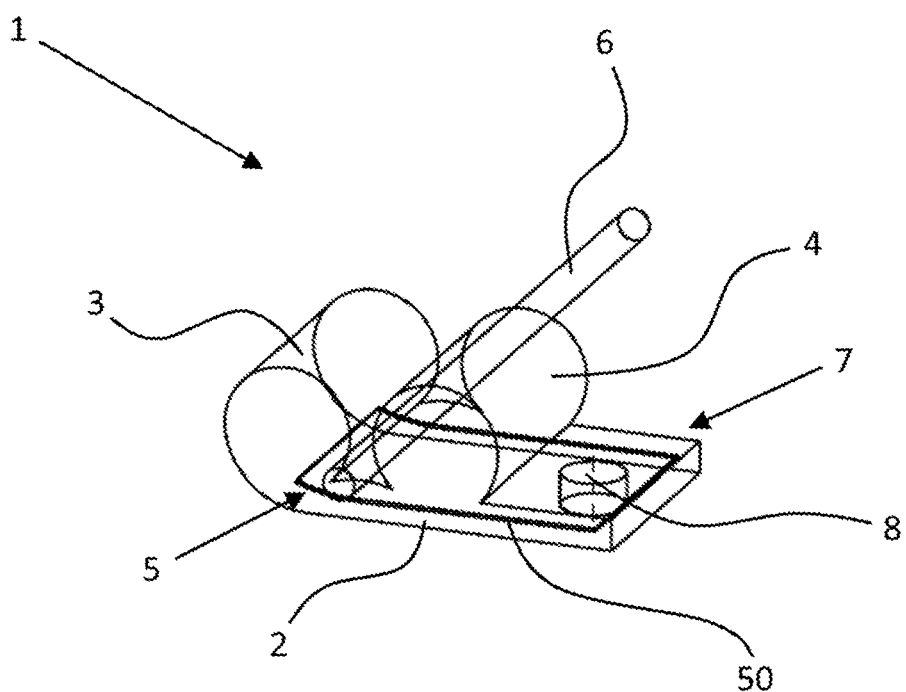

The figures show:

FIG. 1: an embodiment of the fiber clamp according to the invention with a fiber inserted and clamped therein in a perspective view FIG. 2: a fiber clamp according to FIG. 1 in a side view FIG. 3: an embodiment of the fiber clamp according to the invention with a spring element which is embedded in the base plate and an inserted fiber in a sectional view FIG. 4: a fiber clamp according to FIG. 3 in a perspective wire view FIG. 1 shows a possible embodiment of the fiber clamp 1 according to the invention. It comprises a base plate 2 and two cylindrical clamping bodies 3 and 4 which are made in one piece or are realized integrally with the base plate 2 and are disposed parallel and adjacent to one another, wherein the base plate 2 and the two clamping bodies 3 and 4 comprise an essentially tangential arrangement to one another.

The base plate 2 and the two clamping bodies 3 and 4 consist of a rubber-like or elastomeric material. In this exemplary embodiment the tensioning device 5 is formed of or realized by the intrinsic elastic or resilient properties of the rubber-like or elastomeric material of the base plate 2 or the clamping bodies 3, 4, i.e. the elastic properties of the rubber-like material of the base plate 2 and of the two clamping bodies 3, 4 ensure that the clamping bodies 3 and 4 are pressed towards one another or pressed against one another in one direction without additional force.

The base plate 2 comprises a fastening section 7, which comprises a through hole 8. By means of the fastening section 7 or the through hole 8 located therein, fastening of the fiber clamp 1 to a higher-level unit, for example a fiber positioning device, is made possible in a simple manner.

An optical fiber 6 is disposed or clamped between the two clamping bodies 3 and 4 and the section of the base plate 2 delimited by the clamping bodies.

The tensioning device 5, i.e. In the present embodiment, the intrinsic elastic properties of the rubber-like material of the base plate 2 and the clamping body 3, 4 ensures that the two clamping bodies 3, 4 are pressed towards one another in one direction. This effects a contacting of the optical fiber 6 which is disposed between the two clamping bodies 3, 4 and the corresponding section of the base plate 2 via three line contacts. The optical fiber 6 is thus clamped from three sides.

Due to the mechanical and tribological properties of the rubber-like material of the base plate 2 and the clamping bodies 3, 4 with a large elasticity and a comparatively high coefficient of friction, the clamping contact between the fiber 6 and the corresponding section of the base plate 2 and the clamping body 3, 4 results in a holding or clamping, in which a displacement of the fiber 6 in its longitudinal extension or in a direction substantially perpendicular to the direction of the clamping forces acting on the fiber 6 is only possible with increased effort.

Since due to the high elasticity of the rubber-like material also a large contact area between the fiber 6 and the base plate 2 and the clamping bodies 3, 4 is effected, the aforementioned effect with regard to holding the fiber 6 is further enhanced. At the same time, the high elasticity of the rubber-like material of the base plate 2 and the clamping bodies 3, 4 ensures that the forces, in particular compressive forces, which act on the fiber 6 due to the clamping, remain low, so that internal effects, such as the refraction of light in the case of glass fibers, are greatly reduced or avoided.

FIG. 2 shows the fiber clamp according to FIG. 1 in a side view. In this view, in particular the web section 9 of the base plate 2 between the two clamping bodies 3 and 4 can be clearly seen compared to the illustration in FIG. 1. Here, the web section 9 comprises a convex or bulbous shape in cross section, in which the resulting projection points in one direction to the two clamping bodies 3, 4. The convex cross-sectional shape of the web section 9 ensures in particular that in addition to the line contact between the fiber 6 and the web section 9 of the base plate 2, there is a line contact between the fiber 6 and the respective clamping body 3 or 4. Without the convex-shaped web section 9 there would be the possibility that the two clamping bodies 3, 4 would make contact with one another and thereby possibly prevent contact between the clamping bodies 3, 4 and the fiber 6.

FIGS. 3 and 4 show a further embodiment of a fiber clamp according to the invention, wherein FIG. 3 corresponds to a sectional illustration and FIG. 4 to a perspective wire illustration.

The fiber clamp 1 shown in FIGS. 3 and 4 differs from the fiber clamp according to FIG. 1 or FIG. 2 only in that the tensioning device 5 additionally comprises a spring element 50 which is embedded in the fiber clamp 1 in the form of a spring plate. With the aid of this spring plate 50, the intrinsic elastic properties of the rubber-like material from which the base plate 2 and the clamping bodies 3 and 4 are made can be strengthened, so that the clamping forces that can be applied to the fiber 6 are correspondingly increased.

REFERENCE LIST 1 fiber clamp
2 base plate
3, 4 clamping body 5 tensioning device
6 fiber
7 fastening section
8 through hole
9 web section (of base plate 2)
50 spring element

The invention claimed is:

1. A fiber clamp, comprising a base plate and at least two clamping bodies arranged substantially parallel to one another on the base plate, wherein adjacent clamping bodies are pressed towards one another in one direction via a tensioning device, which either is formed in the base plate or in the base plate and the clamping bodies, the fiber clamp configured so that one fiber disposed between the base plate and the adjacent clamping bodies can be clamped with simultaneous contacting of the base plate and the adjacent clamping bodies.

2. The fiber clamp according to claim 1, wherein the clamping bodies are integrally formed with the base plate.

3. The fiber clamp according to claim 2, wherein the clamping bodies have substantially the shape of a cylinder or a partial cylinder.

4. The fiber clamp according to claim 2, wherein the base plate in a region between adjacent clamping bodies comprises a web section with a convex cross-sectional geometry.

5. The fiber clamp according to claim 2, wherein either the clamping bodies alone, or the clamping bodies and the base plate comprise a rubber-like material.

6. The fiber clamp according to claim 2, wherein either the clamping bodies alone, or the clamping bodies and the base plate consist of a rubber-like material.

7. The fiber clamp according to claim 2, wherein the tensioning device comprises at least one spring element.

8. The fiber clamp according to claim 7, wherein the at least one spring element comprises a spring plate.

9. The fiber clamp according to claim 2, wherein the base plate comprises a fastening section with a through hole for fastening to a higher-level unit.

10. The fiber clamp according to claim 1, wherein the clamping bodies have substantially the shape of a cylinder or a partial cylinder.

11. The fiber clamp according to claim 1, wherein the base plate in a region between adjacent clamping bodies comprises a web section with a convex cross-sectional geometry.

12. The fiber clamp according to claim 1, wherein either the clamping bodies alone, or the clamping bodies and the base plate comprise a rubber-like material.

13. The fiber clamp according to claim 1, wherein either the clamping bodies alone, or the clamping bodies and the base plate consist of a rubber-like material.

14. The fiber clamp according to claim 1, wherein the tensioning device comprises at least one spring element.

15. The fiber clamp according to claim 14, wherein the at least one spring element comprises a spring plate.

16. The fiber clamp according to claim 1, wherein the base plate comprises a fastening section with a through hole for fastening to a higher-level unit.

* * * * *